(12) United States Patent
Iikawa et al.

(10) Patent No.: US 8,976,460 B2
(45) Date of Patent: Mar. 10, 2015

(54) VARIFOCAL LENS BARREL

(75) Inventors: Makoto Iikawa, Saitama (JP); Ichiro Imaei, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 54 days.

(21) Appl. No.: 13/239,950

(22) Filed: Sep. 22, 2011

(65) Prior Publication Data

US 2012/0075720 A1  Mar. 29, 2012

(30) Foreign Application Priority Data

Sep. 28, 2010 (JP) ................ 2010-216381

(51) Int. Cl.
| | |
|---|---|
| G02B 15/14 | (2006.01) |
| G02B 7/10 | (2006.01) |
| G02B 13/00 | (2006.01) |
| G02B 15/177 | (2006.01) |
| G02B 7/04 | (2006.01) |
| G02B 7/02 | (2006.01) |

(52) U.S. Cl.
CPC ............... *G02B 7/10* (2013.01); *G02B 13/009* (2013.01); *G02B 15/177* (2013.01); *G02B 7/04* (2013.01); *G02B 7/02* (2013.01)
USPC ........................... 359/695; 359/694; 359/701

(58) Field of Classification Search
CPC ...... G02B 15/14; G02B 13/009; G02B 13/04; G02B 15/167; G02B 7/102; G02B 7/08; G02B 7/04; G02B 7/023; G02B 7/02; G02B 3/14

USPC .......................... 359/824, 694–696, 699–704
See application file for complete search history.

(56) References Cited

U.S. PATENT DOCUMENTS

| 4,993,815 A * | 2/1991 | Yamazaki et al. ............ 359/699 |
| 5,862,416 A * | 1/1999 | Nishimura ....................... 396/72 |
| 6,333,825 B1 | 12/2001 | Hamasaki et al. |
| 6,631,035 B2 * | 10/2003 | Iikawa et al. .................. 359/699 |
| 6,876,499 B2 * | 4/2005 | Iikawa ........................... 359/699 |
| 6,891,668 B2 * | 5/2005 | Nomura et al. ............... 359/363 |
| 2005/0057822 A1 * | 3/2005 | Hayashi ........................ 359/694 |
| 2010/0328786 A1 * | 12/2010 | Nomura ........................ 359/701 |

FOREIGN PATENT DOCUMENTS

JP  3490957  11/2003

* cited by examiner

*Primary Examiner* — Scott J Sugarman
*Assistant Examiner* — Daniele Manikeu
(74) *Attorney, Agent, or Firm* — Greenblum & Bernstein P.L.C.

(57) ABSTRACT

A varifocal lens barrel includes a plurality of lens groups, each of which are linearly movable in the optical axis direction thereof without rotating about the optical axis during a zooming operation and during a focusing operation, including a base barrel which is linearly movable in the optical axis direction by rotation of a zoom operational ring, wherein lens frames of the respective lens groups are each supported by the base barrel.

17 Claims, 6 Drawing Sheets

VARIFOCAL LENS BARREL

BACKGROUND OF THE INVENTION

1. Field of the Invention

The present invention relates to a varifocal lens barrel applied to various still cameras and movie cameras.

2. Description of the Related Art

A varifocal lens barrel is a kind of lens barrel in which the focal plane (of the varifocal lens system incorporated therein) moves in the optical axis direction when zooming (varying of the focal length) is carried out. The varifocal lens barrel is provided with a focus compensation mechanism for compensating the moving amount of the focal plane to carry out focusing (on an object to be photographed) during zooming. The varifocal lens barrel moves a plurality of lens groups in the optical direction during zooming, and for that purpose, all (or some) of the lenses are in cam engagement with a zoom cam ring so as to integrally rotate with a zoom operational ring. Thus, the moving position of each lens group relative to a fixed barrel of the lens barrel is controlled by rotation of the zoom cam ring. A lens group(s) (of the lens system provided in the lens barrel) in which, due to design issues with the lens barrel therefor, it is difficult to engage with a zoom cam ring of the lens barrel via cam engagement utilize another separate cam ring that integrally rotates with the zoom cam ring, so that that such a lens group(s) can be moved along the optical axis direction via cam engagement with this separate cam ring. Japanese Patent No. 3,490,957 discloses a configuration in which three lens groups (first through third lens groups) of four lens groups (first through fourth lens groups) of a varifocal lens system are in cam engagement with a zoom cam ring, and one lens group (fourth lens group) is in cam engagement with another separate cam ring.

The moving amount of the focal plane of a varifocal lens system varies in accordance with the variation of the focal length during zooming, and therefore, focusing cannot be carried out by a single rotation of the focus operational ring by a predetermined angle. Thus, the focus compensation mechanism requires a special function for varying the moving amount of the focusing lens group in the optical axis direction, in accordance with the variation of the focal length. In order to accomplish this function, the above-mentioned Japanese Patent No. 3,490,957 discloses a focus cam barrel that is operatively associated with the rotation of a zoom cam barrel, and focusing lens group is in cam engagement with this focus cam barrel. When the zoom cam barrel rotates, the position of the operatively associated focus cam barrel changes in the optical axis direction, and during focusing, the focusing lens group rotates about the optical axis while moving along the optical axis direction, relative to the focus cam barrel. Provided the cam shape of the focus cam barrel is defined appropriately, the focusing lens group can move by a different moving amount in the optical axis direction during zooming, whereby an accurate focusing operation can be accomplished through single rotation operation of the focus operational ring by a predetermined angle. Note that although the term "zoom (zooming)", in the strict sense, normally refers to "zooming by a zoom lens system" in which the focal position does not vary regardless of a variation of magnification, the description of the present invention uses the term "zoom (zooming)" as "variation of magnification by a varifocal lens system."

3. Problems to be Solved by the Present Invention

According to the lens barrel of the above-mentioned Japanese Patent No. 3,490,957, during zooming, the moving amount of each lens group in the optical axis direction is controlled relative to the fixed barrel of the lens barrel. However, when the focal length ratio of the maximum focal length to the minimum focal length (also referred to as "zoom magnification" or "zoom ratio") increases, the moving amount of each lens group in the optical axis direction during zooming increases. To cope with this problem, the length of the zoom cam barrel in the optical axis direction needs to be increased, however, this causes difficulties in providing a high zoom-magnification zoom lens barrel with shorter length in the optical axis direction (i.e., hinders miniaturization of the high zoom-magnification zoom lens barrel). A multi-stage cam ring can used as an alternative structure in which one lens group is moved relative to another lens group in the optical axis direction to serve as a zooming mechanism. However, if the number of stages of the cam ring increase, there is an increased risk of assembly error in the plurality of cam rings, and the cam engagement between each cam ring also causes an accumulation of error in the plurality of cam rings. This would worsen the assembly error and deteriorate the overall operation of the lens barrel, which would further increase the risk of unstable imaging performance, inappropriate zooming and inappropriate focusing.

According to the lens barrel of the above-mentioned Japanese Patent No. 3,490,957, the focusing lens group is in cam engagement with the focus cam ring, and during focusing, the positioning of the focusing lens group in the optical axis direction is carried out by rotating the focusing lens group about the optical axis relative to the focus cam ring (known as a rotatable telescoping lens mechanism). This rotatable telescoping lens mechanism causes decentering of lens optical axis due to rotation of focusing lens group (inconsistent alignment of lenses or lens frames), resulting in unstable imaging performance during photography.

SUMMARY OF THE INVENTION

The present invention provides a varifocal lens barrel having a reduced lens assembly error and a stable imaging performance, whereby appropriate zooming and focusing can be carried out.

According to an aspect of the present invention, a varifocal lens barrel is provided, including a plurality of lens groups, each of which are linearly movable in the optical axis direction thereof without rotating about the optical axis during a zooming operation and during a focusing operation, including a base barrel which is linearly movable in the optical axis direction by rotation of a zoom operational ring, wherein lens frames of respective the lens groups are each supported by the base barrel.

It is desirable for at least one lens group of the plurality of lens groups to be integrally supported by the base barrel, and the other lens groups of the plurality of lens groups to be supported by the base barrel to be movable in the optical axis direction relative to the base barrel.

It is desirable for the varifocal lens barrel to include a zoom cam ring which is rotatable by manual rotation of the zoom operational ring, and a plurality of sub zoom cam rings which are integrally rotatable with the zoom cam ring, wherein the sub zoom cam rings are supported by the base barrel via cam engagement with the zoom cam ring and are movable in the optical axis direction by rotation of the zoom cam ring. At least one lens frame of a corresponding lens group of the plurality of lens groups is in cam engagement with the sub zoom cam rings so that the at least one lens frame is movable in the optical axis direction by rotation of the sub zoom cam rings.

It is desirable for one of the plurality of sub zoom cam rings which has the smallest diameter to be provided at a rearward position with respect to the other sub zoom cam rings of the plurality of sub zoom cam rings, with respect to the optical axis direction.

It is desirable for the corresponding lens group of the at least one lens frame that is in cam engagement with the sub zoom cam rings to include a focusing lens group. The lens frame of the focusing lens group includes a main lens frame and a sub lens frame, which are respectively relatively movable with respect to each other in the optical axis direction. The sub lens frame is in cam engagement with one of the sub zoom cam rings and moves in the optical axis direction during zooming. The main lens frame integrally supports the focusing lens group and is movable in the optical axis direction relative to the sub lens frame without relatively rotating about the optical axis.

It is desirable for one of the main lens frame and the sub lens frame to be provided with at least one open connection groove that is elongated in the optical axis direction, and for the other of the main lens frame and the sub lens frame to be provided with a corresponding connection lug which is engaged with the open connection groove and linearly movable relative to the open connection groove in the optical axis direction.

It is desirable for the varifocal lens barrel to include a focus cam ring which is integrally rotatable with the sub zoom cam rings and relatively movable with respect to the sub zoom cam rings in the optical axis direction, and a movable member which is in cam engagement with the focus cam ring and also in cam engagement with the sub lens frame, wherein aid movable member linearly movable in the optical axis direction and rotatable about the optical axis. The movable member is rotatably engaged with the main lens frame so that the movable member is integrally connected with the main lens frame in the optical axis direction and so that the movable member is relatively rotatable about the optical axis with respect to the main lens frame.

It is desirable for the varifocal lens barrel to include a focusing lens group constituting one of the plurality of lens groups; and a focus cam ring which changes a moving amount of the focusing lens group in the optical axis direction in accordance with a predetermined angle by which a focus operation member is rotated during a focusing operation. The focusing lens group does not rotate about the optical axis. A movable member, the position of which relative to the focus cam ring in the optical axis direction changes by rotation of the movable member during focusing, is rotatably engaged with the focusing lens group so that the movable member is integrally connected with the focusing lens group in the optical axis direction and so that the movable member is relatively rotatable about the optical axis with respect to the focusing lens group.

It is desirable for the focusing lens group to be supported by a lens frame, the lens frame including a main lens frame and a sub lens frame, which are relatively movable with respect to each other in the optical axis direction. The sub lens frame moves in the optical axis direction during zooming. The main lens frame integrally supports the focusing lens group in a state so that the main lens frame is integrally connected with the movable member in the optical axis direction and so that the movable member rotates about the optical axis relative to the main lens frame.

It is desirable for the lens groups include a integrally-supported lens group, which is integrally supported by the base barrel so as to integrally move with the base barrel in the optical axis direction, and a movably-supported lens group which is movable in the optical axis direction relative to the base barrel. An integrally-supported lens frame of the integrally-supported lens group is provided with a guide shaft, and at least three guide grooves which are provided at circumferential positions about the optical axis and are respectively elongated in the optical axis direction. A movably-supported lens frame of the movably-supported lens group is provided with a small hole into which the guide shaft is inserted, and is provided with three guide lugs which are engaged with the three guide grooves, respectively.

It is desirable for the guide shaft and one of the guide grooves to be provided at the integrally-supported lens frame at diametrically opposite positions, and for the other two of the guide grooves to be provided at the integrally-supported lens frame at respective circumferential positions so as to be interposed by an imaginary line connecting the centers of the guide shaft with the one of guide grooves.

In an embodiment, a varifocal lens barrel including first through fourth lens groups, each of which are linearly movable in the optical axis direction thereof without rotating about the optical axis during a zooming operation and a focusing operation, including a zoom cam ring which is integrally rotatable with a zoom operational ring, the zoom cam ring being supported by a fixed barrel so as to be manually rotatable about the optical axis; a base barrel which is linearly movable in the optical axis direction by rotation of the zoom cam ring; first and second sub zoom cam rings which are supported by the base barrel to be rotatable about the optical axis; a first lens frame which supports the first lens group and is linearly movable in the optical axis direction by rotation of the first sub zoom cam ring; a second lens frame which supports the second lens group and is linearly movable in the optical axis direction by rotation of first sub zoom cam ring; a third lens frame which supports the third lens group so as to be integrally supported by the base barrel; a fourth lens frame which supports the fourth lens group and is linearly movable in the optical axis direction by rotation of the second sub zoom cam ring; a focus cam ring which is integrally rotatable with the first sub zoom cam ring and movable in the optical axis direction relative to the first sub zoom cam ring; and a movable member which is rotatable about the optical axis and linearly movable in the optical axis direction, the movable member being in cam engagement with the focus cam ring and rotating integrally with a focus operational ring that is supported by the fixed barrel to be manually rotatable about the optical axis. The first lens frame is in cam engagement with the first sub zoom cam ring and is linearly movable in the optical axis direction by rotation of the first sub zoom cam ring. The second lens frame includes a sub lens frame which is in cam engagement with the first sub zoom cam ring to be linearly movable in the optical axis direction by rotation of the first sub zoom cam ring, and a main lens frame which supports the second lens group to be movable only in the optical axis direction relative to the sub lens frame, so that the sub lens frame is in concurrent cam engagement with the first sub zoom cam ring and with the focus cam ring, and so that the main lens frame is integrally connected with the movable member in the optical axis direction and engaged with the movable member to be rotatable about the optical axis.

It is desirable for the third lens frame to be provided with a guide shaft, and at least three guide grooves which are provided at circumferential positions about the optical axis and are respectively elongated in the optical axis direction. The fourth lens frame is provided with a small hole into which the guide shaft is inserted, and is provided with three guide lugs which are engaged with the three guide grooves, respectively. The guide shaft and one of the guide grooves are provided at diametrically opposite positions to each other, and the other two of the guide grooves are provided at the third lens frame at respective circumferential positions so as to be interposed by an imaginary line connecting the centers of the guide shaft with the one of guide grooves.

In an embodiment, a varifocal lens barrel is provided, including a plurality of lens groups, each of which are linearly movable in the optical axis direction thereof without rotating about the optical axis when being moved in the optical axis direction, including a base barrel which is linearly movable in the optical axis direction, a lens frame which is linearly movable along the optical axis, and a movable member which integrally moves with the lens frame in the optical axis direction while being rotatable relative to the lens frame.

It is desirable for the base barrel to be linearly movable in the optical axis direction by rotation of a zoom operational ring, the varifocal lens barrel further including a zoom cam ring which is rotatable by manual rotation of the zoom operational ring, and a plurality of sub zoom cam rings which are integrally rotatable with the zoom cam ring, wherein the sub zoom cam rings are supported by the base barrel via cam engagement with the zoom cam ring and are movable in the optical axis direction by rotation of the zoom cam ring. At least one lens frame of a corresponding lens group of the plurality of lens groups is in cam engagement with the sub zoom cam rings so that the at least one lens frame is movable in the optical axis direction by rotation of the sub zoom cam rings.

It is desirable for the lens frame to support a focusing lens group and to be in cam engagement with the sub zoom cam rings, wherein the lens frame of the focusing lens group includes a main lens frame and a sub lens frame, which are relatively movable with respect to each other in the optical axis direction, the sub lens frame is in cam engagement with one of the sub zoom cam rings and moves in the optical axis direction during zooming, and the main lens frame integrally supports the focusing lens group and is movable in the optical axis direction relative to the sub lens frame without relatively rotating about the optical axis.

It is desirable for the varifocal lens barrel to include a focus cam ring which is integrally rotatable with the sub zoom cam rings and relatively movable with respect to the sub zoom cam rings in the optical axis direction. The movable member is in cam engagement with the focus cam ring and is also in cam engagement with the sub lens frame, wherein the movable member linearly movable in the optical axis direction and rotatable about the optical axis. The movable member is rotatably engaged with the main lens frame so that the movable member is integrally connected with the main lens frame in the optical axis direction and so that the movable member is relatively rotatable about the optical axis with respect to the main lens frame.

It is desirable for the varifocal lens barrel to include a focusing lens group constituting one of the plurality of lens groups, and a focus cam ring which changes a moving amount of the focusing lens group in the optical axis direction in accordance with a predetermined angle by which a focus operation member is rotated during a focusing operation. The focusing lens group does not rotate about the optical axis. The movable member, the position of which relative to the focus cam ring in the optical axis direction changes by rotation of the movable member during focusing, is rotatably engaged with the focusing lens group so that the movable member is integrally connected with the focusing lens group in the optical axis direction and so that the movable member is relatively rotatable about the optical axis with respect to the focusing lens group.

It is desirable for the focusing lens group to be supported by a lens frame, the lens frame including a main lens frame and a sub lens frame, which are relatively movable with respect to each other in the optical axis direction. The sub lens frame moves in the optical axis direction during zooming. The main lens frame integrally supports the focusing lens group in a state so that the main lens frame is integrally connected with the movable member in the optical axis direction and so that the movable member rotates about the optical axis relative to the main lens frame.

According to the present invention, the lens barrel has a base barrel that is linearly movable in the optical direction by rotation of a zoom operational ring, and all lens frames of the corresponding lens groups, that constitute the lens barrel, are supported by the base barrel. Since the lens frames of the all lens groups are assembled within this base barrel, the positioning of each lens frame can be determined in the same base barrel. Thus, according to the varifocal lens barrel of the present invention, assembly error can be reduced, and the stability of imaging performance improves, whereby appropriate zooming and focusing can be carried out. Furthermore, the all lenses can move linearly in the optical axis direction without rotation, any inconsistent alignment of focusing lens group due to rotary protruding lens mechanism is prevented, whereby stable imaging performance during photographing may be accomplished.

The present disclosure relates to subject matter contained in Japanese Patent Application No. 2010-216381 (filed on Sep. 28, 2010) which is expressly incorporated herein by reference in its entirety.

BRIEF DESCRIPTION OF THE DRAWINGS

The invention will be described below in detail with reference to the accompanying drawings, in which.

DETAILED DESCRIPTION OF THE INVENTION

Figure 1:
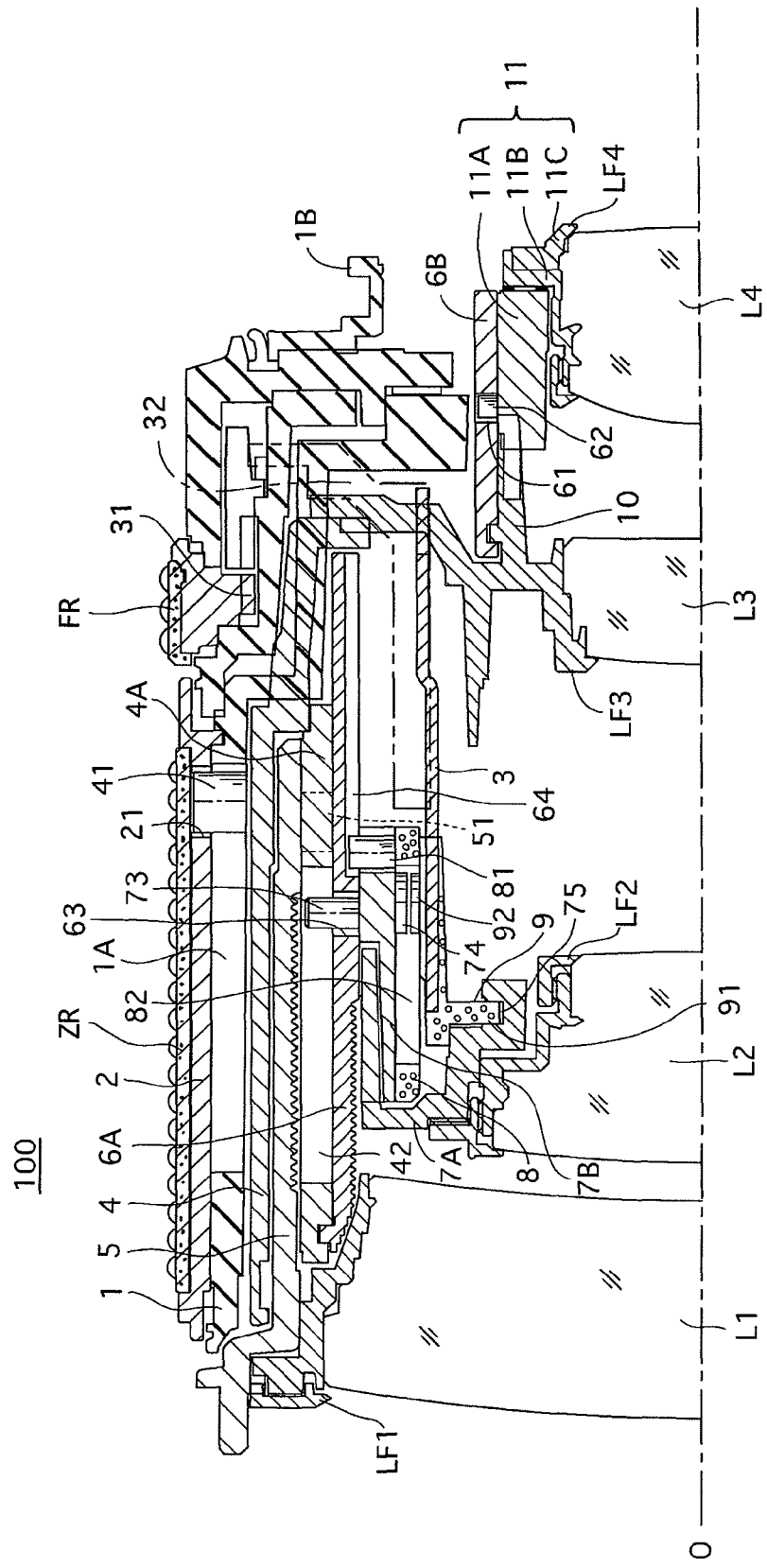
FIG. 1 is a vertical sectional view of a lens barrel at the wide-angle extremity according to the present invention, taken along the optical axis.
Figure 2:
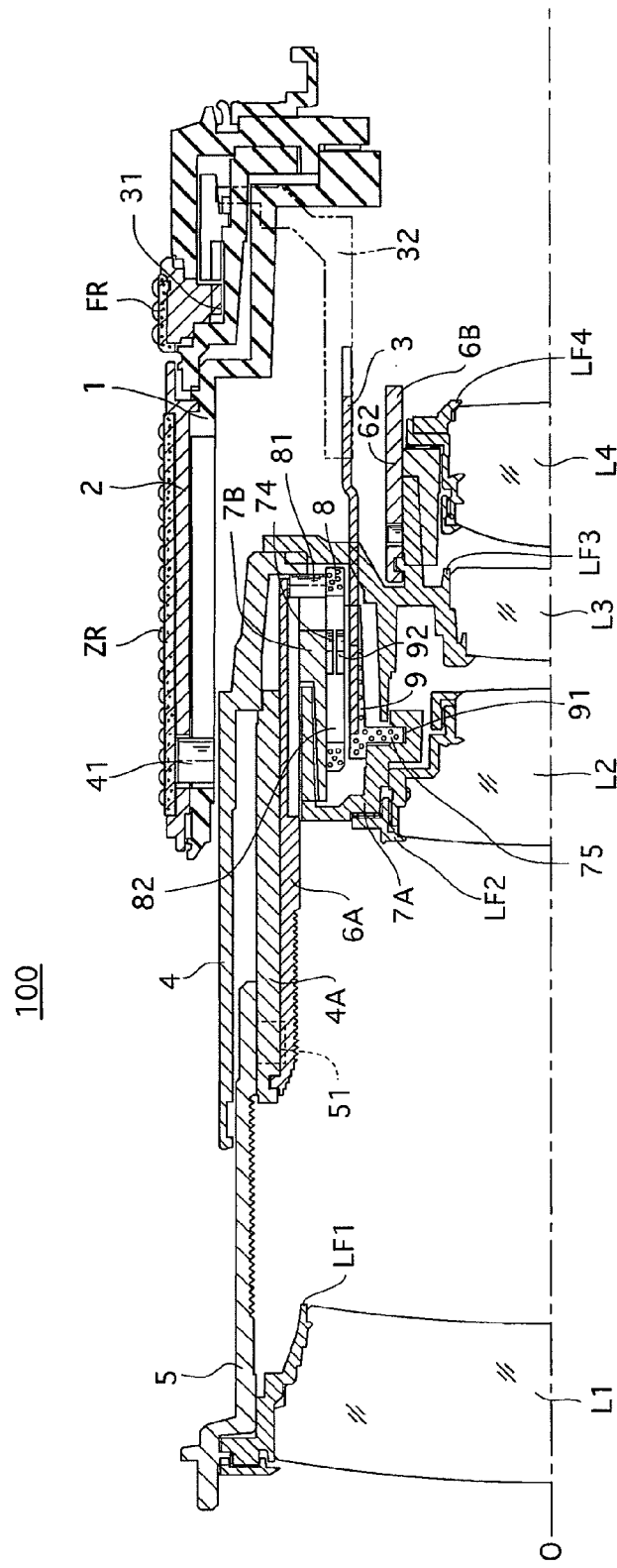
FIG. 2 is a vertical sectional view of the lens barrel of FIG. 1 at the telephoto extremity, taken along the optical axis.

An embodiment of the present invention will be described hereinafter with reference to the drawings. FIG. 1 and FIG. 2 respectively show a sectional view of an upper part of a lens barrel 100 taken along the optical axis O, both in an infinite object focused state, in which FIG. 1 is at the wide-angle extremity (the shortest focal length position) and FIG. 2 is at the telephoto extremity (the longest focal length position). The lens barrel 100 according to the present embodiment is a varifocal lens barrel configured of a first lens group L1, a second lens group L2, a third lens group (integrally-supported lens group) L3 and a fourth lens group (movably-supported lens group) L4, in that order from the object side. In regard to the hatching of the members shown in FIG. 1, the hatching in leftward diagonal bold lines indicates fixed members, the hatching in rightward diagonal lines indicates rotational members, the hatching in leftward diagonal lines indicates movable members along the optical axis direction, and the small circle hatching indicates rotational/movable members which are rotatable about the optical axis and also movable in the optical axis direction. In this context, "rotational" refers to rotation about the optical axis, and "moving in the optical axis direction" refers to a movement parallel to the optical axis. Each of the first through fourth lens groups L1 through L4 in FIGS. 1 and 2 is illustrated as a single lens element, however, in practice, each lens group is actually configured of a plurality of lens elements.

As shown in FIG. 1, a fixed barrel 1 is provided with a lens mount 1B for mounting the fixed barrel 1 onto a camera body (not shown). A zoom operational ring ZR is rotatably provided at a front portion on the outer periphery of the fixed barrel 1 of the lens barrel 100 (on the left side of FIG. 1) for use in carrying out a zooming operation, and a focus operational ring FR is rotatably provided at a rear portion (on the right side of FIG. 1) on the outer periphery of the fixed barrel 1 for use in carrying out a focusing operation. Hence, a photographer can manually rotate the zoom operational ring ZR as well as the focus operational ring FR. The zoom operational ring ZR is provided with a main zoom cam ring 2 (simply referred to as "zoom cam ring 2") that is integrally formed with the inner periphery of the zoom operational ring ZR. The zoom cam ring 2 is rotated, integrally with the rotation of the zoom operational ring ZR, on the outer periphery of the fixed barrel 1. The focus operational ring FR is provided with an internal gear 31 formed integrally on the inner periphery thereof, and the internal gear 31 is engaged with a gear mechanism (not shown). The internal gear 31 is mechanically connected, via an output member 32 of the gear mechanism, to a focus-operation linking lever 3 that extends in the optical axis direction in an inner diameter area of the fixed barrel 1. The focus-operation linking lever 3 activates a varifocal compensation mechanism, the detailed structure of which will be explained hereinafter.

A base barrel 4, which is movable in the optical axis direction, is provided in the inner periphery of the fixed barrel 1 to be supported thereby. A cam follower 41 is provided on the outer periphery of the base barrel 4 to project in the radial direction therefrom. A linear guide groove 1A is formed through the base barrel 1 and extends in the optical axis direction. The cam follower 41 extends through the linear guide groove 1A and further projects to fit into a cam groove (lead groove) 21 that is formed in the inner surface of the zoom cam ring 2, so that the cam follower 41 is in cam engagement with the cam groove 21. According to this structure, when the zoom cam ring 2 rotates by a manual rotation of the zoom operational ring ZR, via engagement of the cam follower 41 with the cam groove 21 and with the linear guide groove 1A, the base barrel 4 linearly moves in the optical axis direction.

The base barrel 4 has a dual-barrel structure, integrally accommodating a base inner barrel 4A in the inner periphery of the base barrel 4. A first lens barrel 5 is provided in the space between the base barrel 4 and the base inner barrel 4A and is movable in the optical axis direction relative to the base barrel 4. A first lens frame LF1, which fixedly supports the first lens group L1, is integrally formed with the first lens barrel 5. A first sub zoom cam ring 6A is accommodated in the inner peripheral space of the base inner barrel 4A. The first sub zoom cam ring 6A moves together with the base inner barrel 4A in the optical axis direction, and rotates relative to the base inner barrel 4A about the optical axis O. The first sub zoom cam ring 6A is connected to the zoom cam ring 2 by a connector (not shown) to be integrally rotatable with each other about the optical axis and relatively movable to each other in the optical axis direction. The first lens barrel 5 is provided with a cam follower 51 that projects in the inner radial direction, and the cam follower 51 engages into a linear guide groove formed through and extending in the optical axis direction of the base inner barrel 4A (not shown). The cam follower 51 also projects into a cam groove that is formed on the outer periphery of the first sub zoom cam ring 6A (not shown). Accordingly to this cam engagement, when the first sub zoom cam ring 6A rotates, the first lens barrel 5, i.e., the first lens group L1, linearly moves in the optical axis direction.

The base barrel 4 incorporates a second lens group L2, a third lens group L3 and a fourth lens group L4. The second lens group L2 serves for focusing compensation, and is also referred to as a "focusing lens group." The second lens group L2 is supported by a second lens frame LF2, and is provided with a "varifocal compensation mechanism" that is a mechanism for moving the second lens group L2 in the optical axis direction by rotation of the first sub zoom cam ring 6A and of the focus operational ring FR. The varifocal compensation mechanism will be explained in detail hereinafter. The third lens group L3 is supported by a third lens frame LF3 that is integrally formed with the base barrel 4, thus the third lens group L3 moves in the optical axis direction together with the base barrel 4. The fourth lens group L4 is supported by a fourth lens frame LF4 at the rear end of the base barrel 4 so that the fourth lens group L4 can move in the optical axis direction relative to the base barrel 4. The detailed moving structure of the fourth lens frame LF4 will be explained hereinafter. A second sub zoom cam ring 6B is provided at (around) the outer periphery of the fourth lens frame LF4, rotatably supported at the rear end of the base barrel 4. The second sub zoom cam ring 6B is connected to the first sub zoom cam ring 6A by a connector (not shown) so as to integrally rotate. A cam groove 61 is formed in the second sub zoom cam ring 6B, and a cam follower 62 projecting in the radial direction of the fourth lens frame LF4 is in cam engagement with this cam groove 61. According to this cam engagement of the cam follower 62 of the fourth lens frame LF4 with the cam groove 61 of the cam ring 6B, when the second sub zoom cam ring 6B rotates, the fourth lens frame LF4, i.e. the fourth lens group L4, moves in the optical axis direction.

Figure 3:
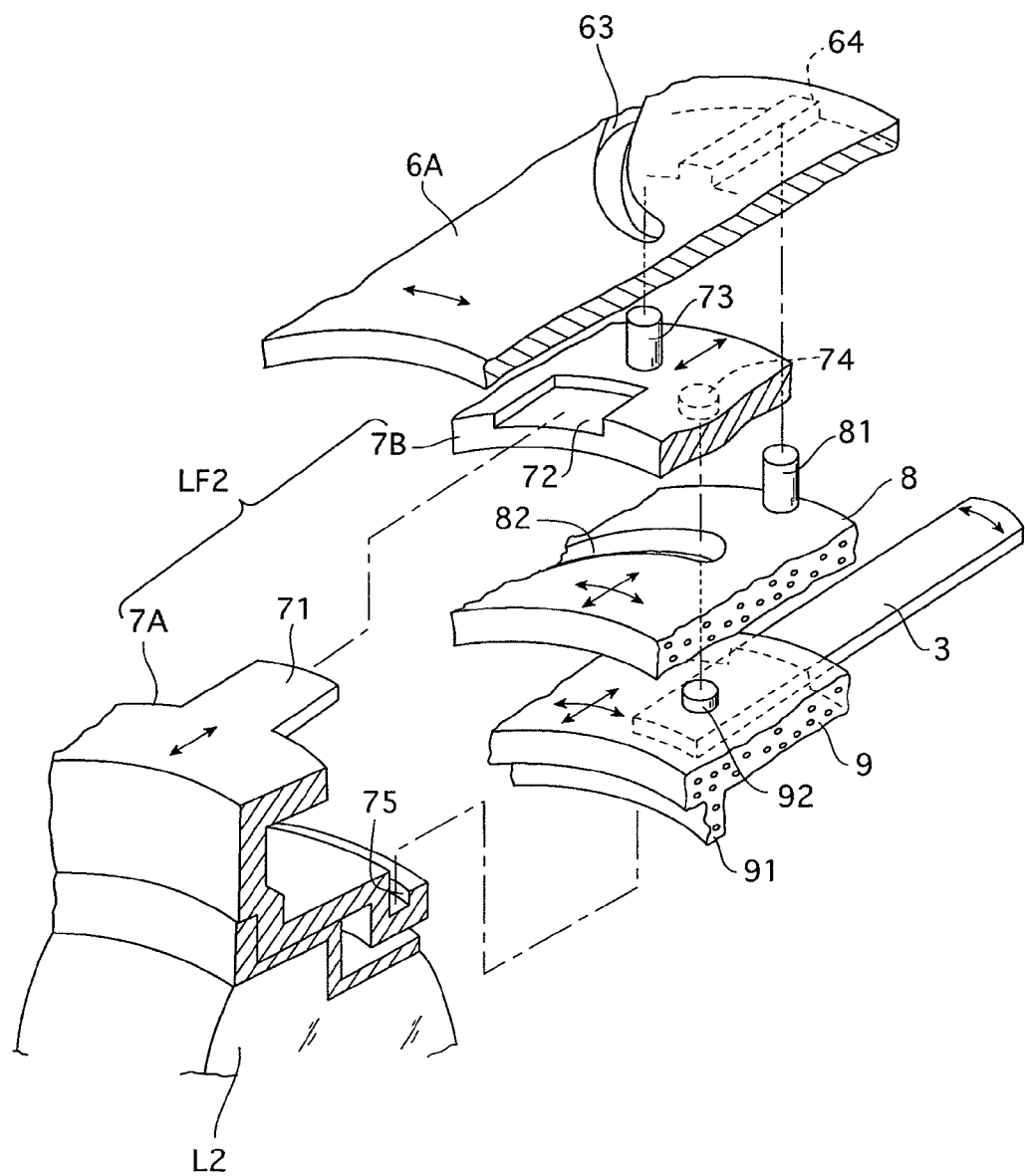
FIG. 3 is an exploded perspective view showing an overall structure of a part of a varifocal compensation mechanism.

The varifocal compensation mechanism for moving the second lens group L2, i.e., the focusing lens group, will be explained hereinbelow. FIG. 3 is an exploded perspective view showing an overall structure of significant parts of the varifocal compensation mechanism. The second lens frame LF2 of the second lens group L2 is configured of a main lens frame 7A and a sub lens frame 7B, which are respectively cylindrical and separately formed with respect to the optical axis direction. The main lens frame 7A is provided with a connection lug 71, having a rectangular shape as seen in the plain view, which projects in the rearward direction. An open connection groove 72, having an open front end, is formed on the peripheral surface of the sub lens frame 7B. The connection lug 71 is engaged with the open connection groove 72. There are, for example, three sets of this combination of the connection lug 71 and the open connection groove 72 provided in the circumferential direction of the second lens frame LF2. Due to the engagement of the connection lugs 71 with the open connection grooves 72, the main lens frame 7A and the sub lens frame 7B integrally rotate about the optical axis, and move relative to each other for a predetermined length in the optical axis direction. An outer cam follower 73 is provided on the outer peripheral surface of the sub lens frame 7B and projects in the (outward) radial direction therefrom. An inner cam follower 74 is provided on the inner peripheral surface of the sub lens frame 7B and projects in the (inward) radial direction therefrom. The outer cam follower 73 extends through a cam groove 63 formed in the first sub zoom cam ring 6A, and enters into a linear guide groove 42 formed in the base inner barrel 4A and elongated in the optical direction (see FIG. 1). According to this structure, when the sub zoom cam ring 6A rotates, the sub lens frame 7B moves in the optical axis direction by the cam engagement of the cam groove 63 with the outer cam follower 73.

A focus cam ring 8, having a predetermined shape of cam groove, is provided in the inner peripheral space of the sub lens frame 7B. A connection pin 81 is provided on the outer peripheral surface and projects in the radial direction at the rear end of the focus cam ring 8. The connection pin 81 engages into a connection groove 64, which is formed on the inner peripheral surface of the first sub zoom cam ring 6A and is elongated in a direction parallel to the optical axis O. Due to the cam engagement of the connection pin 81 with the connection groove 64, the focus cam ring 8 integrally rotates with the rotation of the first sub zoom cam ring 6A, whereas the focus cam ring 8 is capable of moving in the optical axis direction independently from the first sub zoom cam ring 6A. The focus cam ring 8 is provided with a cam groove 82, with which the inner cam follower 74 of the sub lens frame 7B of the focusing lens group L2 is in cam engagement, in a state where the inner cam follower 74 substantially enters halfway into the cam groove 82 from the outer side thereof.

A main lens frame movable ring (movable member) 9 is provided in the inner peripheral space of the focus cam ring 8. An inward flange 91 is provided on the inner peripheral surface of the main lens frame movable ring 9. The inward flange 91 is engaged with a ring groove 75 that is formed on the outer peripheral surface of a cylindrical frame portion of the main lens frame 7A of the focusing lens group L2, such that the inward flange 91 and the main lens frame 7A are relatively rotatable. A cam follower 92 is provided on the outer peripheral surface of the main lens frame movable ring 9 and projects in the radial direction therefrom. The cam follower 92 is in cam engagement with the cam groove 82 of the focus cam ring 8, in a state such that the cam follower 92 substantially enters halfway into the cam groove 82, from the inner side thereof. The focus-operation linking lever 3 is connected to the focus operational ring FR and elongating parallel to the optical axis O, and the front end of this focus-operation linking lever 3 has been inserted in the inside of the main lens frame movable ring 9. According to this insertion structure, the main lens frame movable ring 9 integrally rotates with the rotation of the focus-operation linking lever 3, whereas the main lens frame movable ring 9 is capable of moving in the optical axis direction independently from the focus-operation linking lever 3.

The operation of the lens barrel 100 having the above structure will be explained with reference to FIGS. 1 and 2. The zooming operation will be explained first. When the zoom operational ring ZR is manually rotated, for example, from the wide-angle extremity (FIG. 1) towards the telephoto extremity, the zoom cam ring 2 rotates. Accordingly, the base barrel 4, which is in cam engagement with the zoom cam ring 2, forwardly moves in the optical axis direction while the first and second sub zoom cam rings 6A and 6B, respectively connected to the zoom cam ring 2, concurrently rotate. The first lens barrel 5 (the first lens frame LF1 and the first lens group L1), which is in cam engagement with the first sub zoom cam ring 6A, moves in the optical axis direction by rotation of the first sub zoom cam ring 6A. Similarly, the sub lens frame 7B of the second lens group L2 (i.e., the focusing lens group L2), which is in cam engagement with the first sub zoom cam ring 6A, forwardly moves in the optical axis direction. The main lens frame 7A, which is engaged (via the focus cam ring 8 and the main lens frame movable ring 9) with the sub lens frame 7B, also moves in the optical axis direction, and hence, the focusing lens group L2 moves in the optical axis direction. The third lens group L3 integrally moves with the base barrel 4, which is integrally formed with the third lens frame LF3. The fourth lens frame LF4, which is in cam engagement with the second sub zoom cam ring 6B, moves in the optical axis direction upon the second sub zoom cam ring 6B rotating. Accordingly, the fourth lens group L4, supported by the fourth lens frame LF4, moves in the optical axis direction, whereby zooming toward the telephoto extremity is carried out, as shown in FIG. 2.

When zooming is carried out, the rotation of the zoom operational ring ZR, i.e., the rotation of the zoom cam ring 2, causes the base barrel 4 to move in the optical axis direction by an amount almost equal to the length of the zoom cam ring 2. Furthermore, the first lens group L1 and the second lens group L2, which are supported by the base barrel 4, respectively move in the optical axis direction by the first sub zoom cam ring 6A, and the fourth lens group L4 also moves in the optical axis direction by the second sub zoom cam ring 6B. Thus the first lens group L1, which moves in the optical axis direction by the largest moving amount, can move by the distance equal to the cam length (the effective length of the cam parallel to the optical axis) of the zoom cam ring 2 plus the cam length of the first sub zoom cam ring 6A. Accordingly, a desired amount of movement of the lens groups in the optical axis direction can be achieved without requiring a three-stage (or more) zoom cam ring structure, which achieves miniaturization of the lens barrel 100 both lengthwise and in regard to the diameter thereof. Although the lens barrel 100 of the present embodiment has, mechanically, a two-stage structure (namely, the zoom cam ring 2 and the sub zoom cam ring 6A constituting a first stage, and the sub zoom cam ring 6A and the sub zoom cam ring 6B constituting a second stage), the first and second sub zoom cam rings 6A and 6B integrally rotate with each other. Therefore, the movement of the first through fourth lens groups L1 through L4 in the optical axis direction by rotation of the zoom cam ring 2, the sub zoom cam ring 6A and the sub zoom cam ring 6B is substantially equivalent to the case in which the first through fourth lens groups L1 through L4 are moved in the optical axis direction by rotation of the zoom cam ring 2 and a single zoom cam ring (i.e., the sub zoom cam rings 6A+6B), which can be considered as constituting a single-stage cam ring structure. Thus any lens moving amount error due to cam engagement error can be minimized, which contributes to achieving an appropriate zooming operation, and also the overall length of the varifocal lens system can be reduced. Furthermore, since all of the first through fourth lens groups L1 through L4 are supported by the same base barrel 4, the assembly of each lens group as well as each lens frame can be performed by simply setting the mounting positions thereof on the base barrel 4, thus the lens barrel 100 having a reduced assembly error can be accomplished.

According to the varifocal lens system of the present embodiment, when the second lens group, i.e., the focusing lens group L2, moves in the optical axis direction during zooming, focusing is also required due to the simultaneous variation of focused position. Thus, according to the present embodiment, when focusing is carried out by the manually rotation of the focus operational ring FR, the varifocal compensation mechanism serves for maintaining a constant rotation angle of the focus operational ring FR regardless of the object distance. In other words, according to the varifocal compensation mechanism, focusing on an object at the same distance is carried out by manually rotating the focus operational ring FR by a constant angle, regardless of the focal length (the object distance is the same). The operation of this varifocal compensation mechanism will be explained hereinbelow. When the first sub zoom cam ring 6A rotates during zooming, the focus cam ring 8, which is connected to the first sub zoom cam ring 6A via the connection pin 81, integrally rotates with the first sub zoom cam ring 6A while the first sub zoom cam ring 6A also moves the sub lens frame 7B of the focusing lens group L2 in the optical axis direction. Accordingly, the focus cam ring 8 also moves in the optical axis direction by a predetermined length, via cam engagement of the inner cam follower 74 of the sub lens frame 7B with the cam groove 82 of the focus cam ring 8. In this state, when the focus operational ring FR is manually rotated, the focus-operation linking lever 3 rotates via the internal gear 31 and the output member 32, and the connected main lens frame movable ring 9 also rotates. The cam follower 92 of the main lens frame movable ring 9 is in cam engagement with the cam groove 82 of the focus cam ring 8, and hence, the main lens frame movable ring 9 moves, while rotating, in the optical axis direction by a predetermined length. The inward flange 91 of the main lens frame movable ring 9 is engaged with the ring groove 75 formed on the outer peripheral surface of the cylindrical portion of the main lens frame 7A of the focusing lens group L2, and accordingly, when the inward flange 91 rotates on the ring groove 75, the inward flange 91 also moves the main lens frame 7A in the optical axis direction. Thus, by appropriately designing the profile (shape) of the cam groove 82 of the focus cam ring 8, the moving amount of the main lens frame movable ring 9 in the optical axis direction can be adjusted, and the focusing lens group L2, supported by the main lens frame movable ring 9, can move in the optical axis direction, whereby the focusing is carried out.

Figure 4:
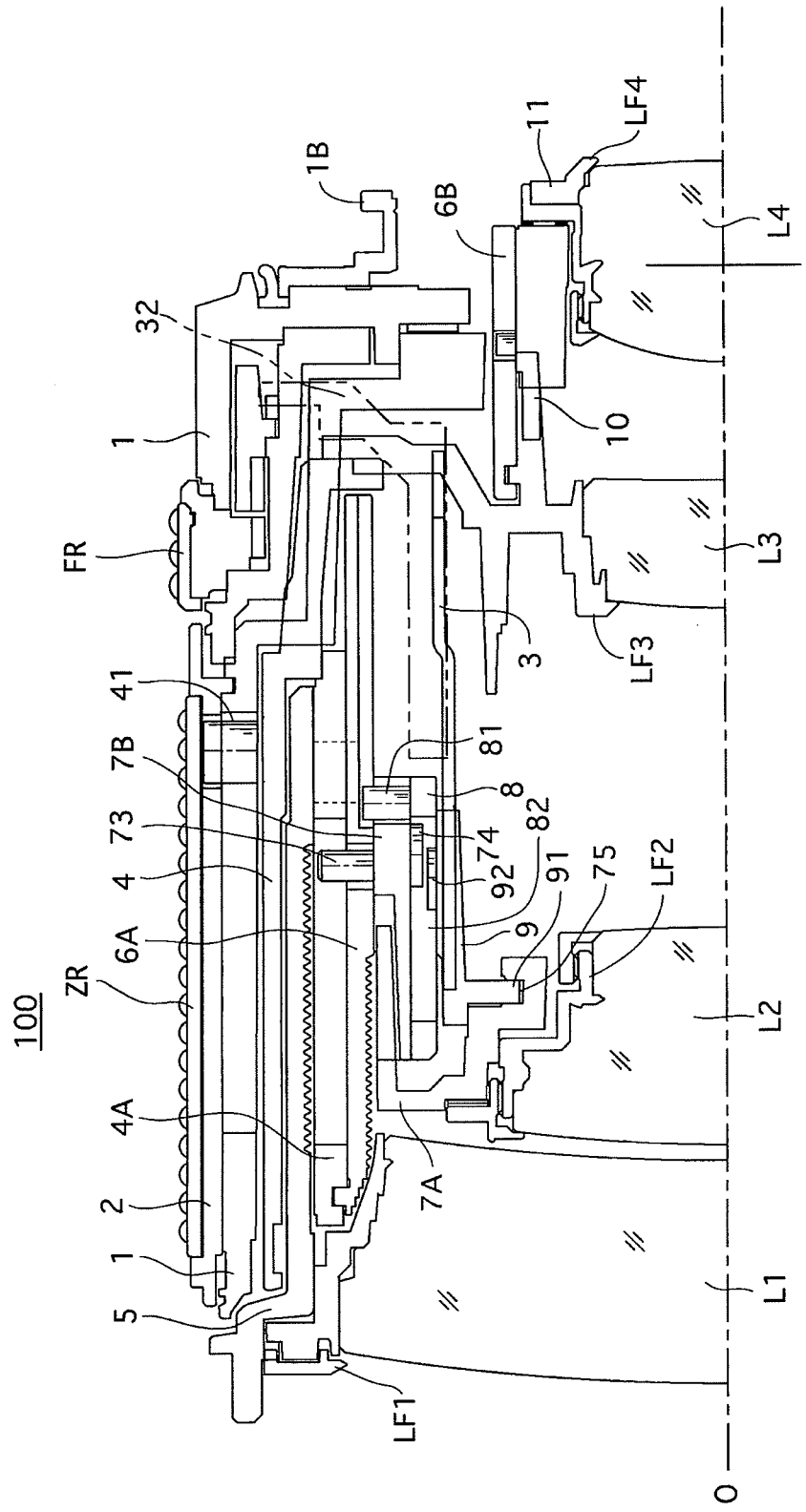
FIG. 4 is a vertical sectional view of the lens barrel of FIG. 1 when focused on a finite object at the wide-angle extremity.

During a focusing operation, as discussed above, the first sub zoom cam ring 6A rotates by an amount of rotation subject to the zooming amount, i.e., the rotational amount of the zoom operational ring ZR. Accordingly, the cam groove 63, having a predetermined shape and formed in the first sub zoom cam ring 6A, changes the position of the inner cam follower 74 of the sub lens frame 7B in the optical axis direction, whereby the moving amount of the focus cam ring 8 in the optical axis direction also changes, accordingly. In other words, the position of the focus cam ring 8 relative to the main lens frame movable ring 9 in the optical axis direction, i.e., the position of the cam groove 82 of the focus cam ring 8 relative to the cam follower 92 of the main lens frame movable ring 9 in the optical axis direction, is capable of being variably controlled. FIG. 4 shows a moving position of the focus cam ring 8 when focusing on an object at a finite distance, at the wide-angle extremity. FIG. 4 clearly shows (although the hatching has been omitted) that when the main lens frame movable ring 9 rotates by the manual rotation of the focus operational ring FR, the cam follower 92 is engaged, before and after the rotation, with different portions of the cam groove 82 of the focus cam ring 8. Therefore, the moving amount of the main lens frame movable ring 9 in the optical axis direction varies even though the main lens frame movable ring 9 is rotated by the same amount, i.e., the same rotational angle, of the focus operational ring FR. In other words, the moving amount of the focusing lens group L2 in the optical axis direction changes. Therefore, by appropriately designing the profile (shape) of the cam groove 82 of the focus cam ring 8, for example based on the mathematical theory described in the aforementioned Japanese Patent No. 3,490,957, a predetermined rotation angle of the focus operational ring FR enables focusing even in the case of varifocal lens system.

As discussed above, in the varifocal compensation mechanism, the main lens frame movable ring 9 is rotatable relative to the main lens frame 7A of the focusing lens group L2 in order to move the focusing lens group L2 in the optical axis direction. The main lens frame movable ring 9 rotates by the manual rotation of the focus operational ring FR, and the main lens frame movable ring 9 is also in cam engagement with the focus cam ring 8, and therefore, during a varifocal compensation operation, the main lens frame 7A does not rotate even though the main lens frame movable ring 9 rotates, and the supported focusing lens group L2 does not rotate either. The front and rear surfaces of the inward flange 91 of the main lens frame movable ring 9 abut against the rear and front inner-walls of the ring groove 75 of the main lens frame 7A without rotating the supported focusing lens group L2, and the ring groove 75 is formed in a complete circle to receive the inward flange 91. Due to these structures, an increased stability of the supported focusing lens group L2 is achieved during linear movement thereof in the optical axis direction. Hence, the focusing lens group L2 no longer requires any rotary protruding lens mechanism like that disclosed in the aforementioned Japanese Patent No. 3,490,957. Accordingly, lens decentration/lens tilt is prevented, whereby a stable photographic imaging performance can be accomplished.

Figure 5:
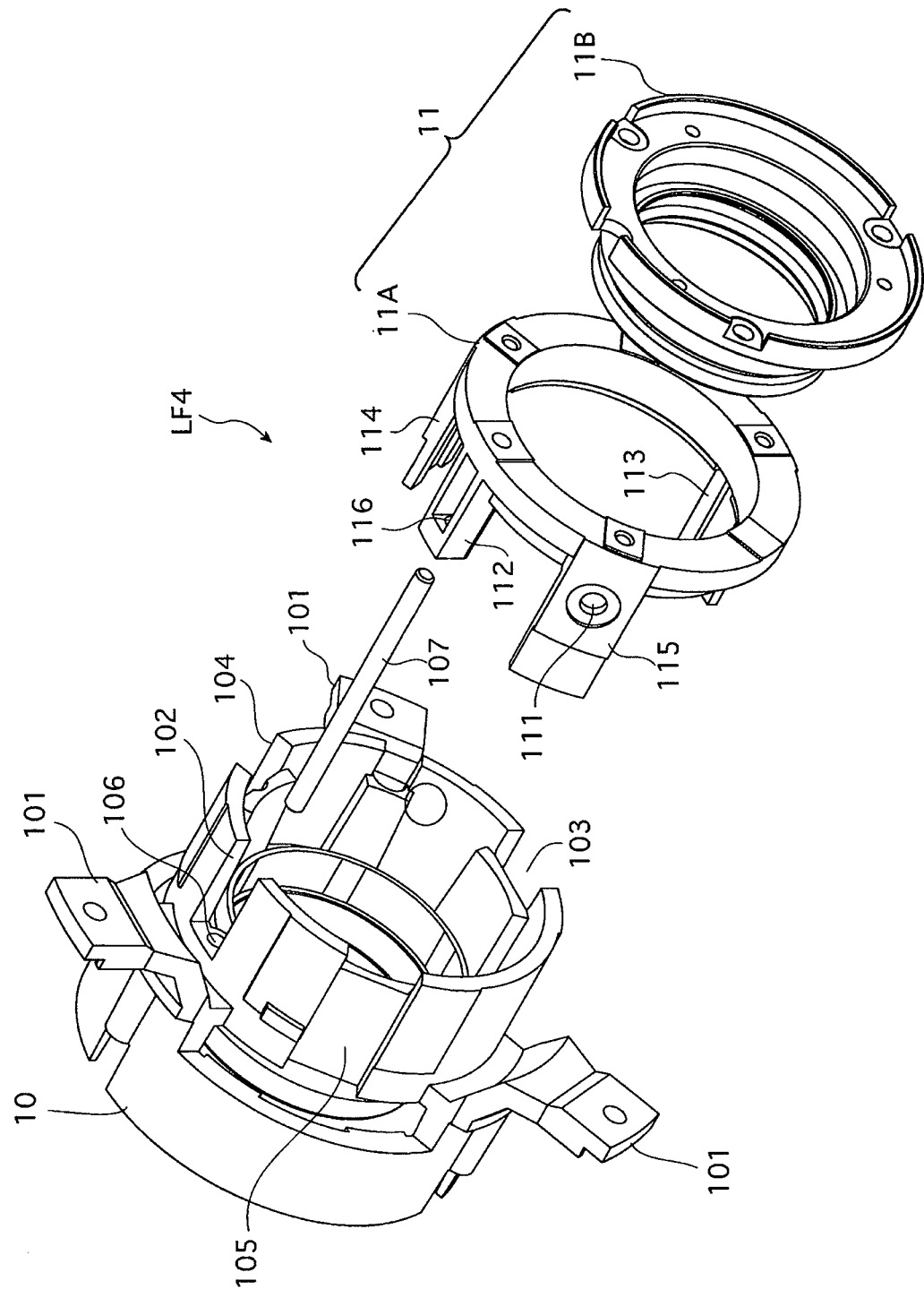
FIG. 5 is an exploded partial perspective view showing a structure of a lens frame of a fourth lens group.
Figure 6A:
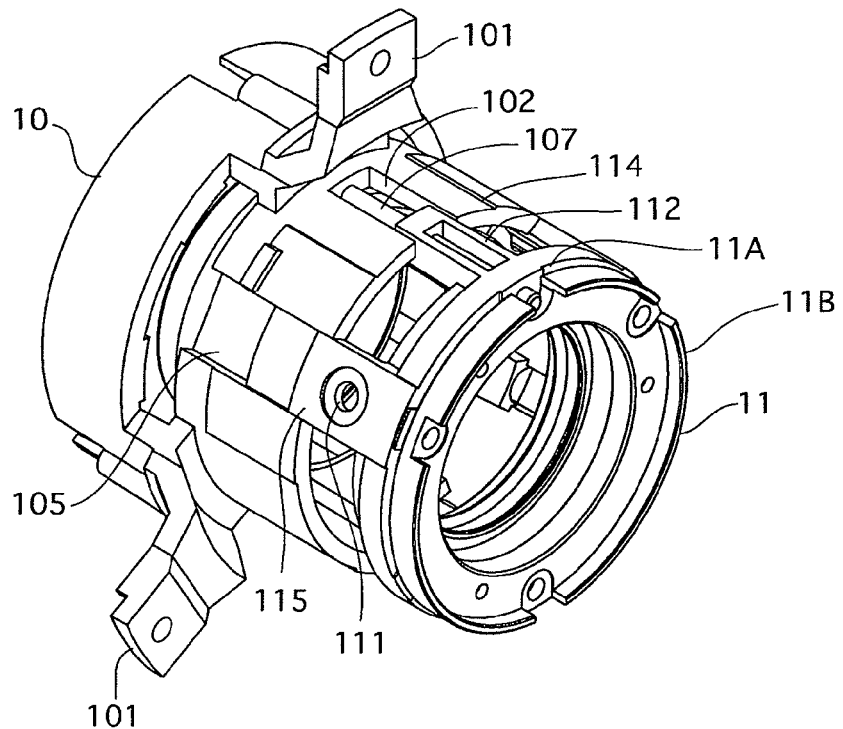
FIG. 6a is a perspective view showing an operational state of the fourth lens group.
Figure 6B:
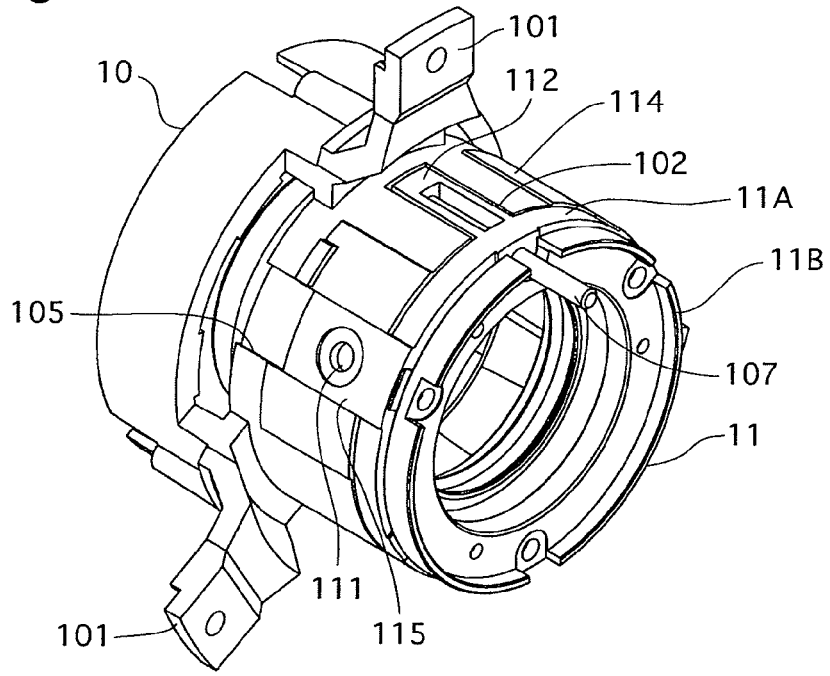
FIG. 6b is a perspective view showing another operational state of the fourth lens group.

FIG. 5 is an exploded perspective view, showing a structure of the fourth lens frame LF4 which supports the fourth lens group L4, so as to be movable in the optical axis direction relative to the base barrel 4, and FIGS. 6a and 6b each show a perspective view of an assembled state the structure of the fourth lens frame LF4. These drawings do not show the structure of the second sub zoom cam ring 6B and the fourth lens group L4 themselves, but show their frame bodies (a integrally-supported frame 10 and a movably-supported frame 11) only. The cylindrical shaped integrally-supported frame 10 is integrally supported at a position on the inner periphery of the base barrel 4 that is shown in FIG. 1. The integrally-supported frame 10 is integrally formed with the third lens frame LF3 of the third lens group L3 (i.e. with the base barrel 4), and fixed to the base barrel 4 by screws (not shown) at fixing lugs 101 projecting in the radial direction from three circumferential positions at one end of the integrally-supported frame 10. The movably-supported frame 11 is engaged with the integrally-supported frame 10 to be movable relative to the integrally-supported frame 10 in the optical axis direction. The movably-supported frame 11 is includes a first frame 11A, a second frame 11B and a third frame (shown in FIG. 1) 11C. The fourth lens group L4 is sandwiched in the space between the second frame 11B and the third frame 11C as shown in FIG. 1. In addition, the fourth lens group L4 is supported by fastening the first frame 11A and the second frame 11B to each other with small screws (not shown).

A reference groove 102, in the shape of cutout groove elongating in the axis direction (the direction parallel to the optical axis), is formed at the circumferential top position (the top position with respect to FIG. 5) on the outer peripheral surface of the integrally-supported frame 10. There are also guide grooves 103, 104 and 105, respectively in a shape of wider cutout groove elongating in the axis direction, formed at three positions different from the position of the reference groove 102 on the outer peripheral surface of the integrally-supported frame 10. One of these guide grooves, namely the guide groove 103, is formed at the circumferential bottom position (the bottom position with respect to FIG. 5), diametrically opposite to the reference groove 102. The other two guide grooves 104 and 105 are respectively positioned on the right and left sides of an imaginary line connected between the centers of the reference groove 102 and the guide groove 103. In other words, the reference groove 102 and the guide groove 103 are diametrically opposite to each other, and the other two guide grooves 104 and 105 are provided at circumferential positions so as to be interposed by the reference groove 102. According to the present embodiment, the three guide grooves 103 through 105 are provided at equi-angular intervals of 120 degrees. A small hole 106 is formed in the front inner base of the reference groove 102, in the rearward optical axis direction, and one end of a guide shaft 107 is inserted into this small hole 106. The guide shaft 107 is a linear, small-diameter cylindrical rod, elongated in the optical axis direction, and having a necessary length for movement of the movably-supported frame 11 in the optical axis direction. The guide shaft 107 is preferably made of any metal having favorable mechanical strength, such as stainless steel or carbon steel.

Three guide lugs 113 through 115 are formed on the outer peripheral surface of the first frame 11A of the movably-supported frame 11, respectively projecting forwardly in the axis direction, and are insertable into the corresponding guide grooves 103 and 105, respectively. A reference leg 112 is formed at the circumferential top position (the top position in FIG. 5) of the first frame 11A. The reference leg 112 is hollow columnar member that projects forwardly in the axis direction to be insertable into the reference groove 102. As shown in FIG. 6a, the movably-supported frame 11 is first assembled in a state such that the fourth lens group L4 is sandwiched between the first frame 11A and the second frame 11B, and thereafter, the movably-supported frame 11 is fitted into the integrally-supported frame 10 in the axis direction. Accordingly, the three guide lugs 113 through 115 are respectively inserted into the corresponding guide grooves 103 through 105, and the reference leg 112 is inserted into the reference groove 102. Furthermore, the other end of the guide shaft 107 extends through a small hole 116 that is formed in the reference leg 112. The cam follower 62 that is cam engaged with the cam groove 61 of the second sub zoom cam ring 6B is mounted on the outer surface of the guide lugs 113 through 115 (see FIG. 1), however, FIG. 5, FIG. 6a and FIG. 6b only show a small hole 111 for mounting the cam follower 62.

Accordingly, during zooming, the movably-supported frame 11 of the fourth lens group L4 moves in the optical axis direction by rotation of the second sub zoom cam ring 6B. Furthermore, as shown in FIGS. 6a and 6b, the movement of this movably-supported frame 11 in the optical axis direction is carried out while the reference leg 112 moves along the reference groove 102, and while the guide shaft 107, which has been fixed in and supported by the integrally-supported frame 10, extends through the reference leg 112. Thus, the rigidity of the guide shaft 107 contributes to the stable positioning of the movably-supported frame 11 in the optical axis direction, whereby the tilt/decentration of the lens frame of the fourth lens group L4, i.e., tilt/decentration of the optical axis O, is prevented. Furthermore, the guide lug 113 is inserted into the corresponding guide groove 103, which is provided diametrically opposite to the guide shaft 107. This engagement structure of the guide lug 113 with the guide groove 103 prevents rotation of the movably-supported frame 11 about the optical axis. The other guide lugs 114 and 115 are inserted into the corresponding guide grooves 104 and 105, respectively, and also this engagement structure supports the guide shaft 107 both from the right and left sides, whereby the stable position of the guide shaft 107 in the optical axis direction is maintained, and tilting thereof is prevented. Therefore, during zooming, when the fourth lens frame LF4 moves in the optical axis direction by the second sub zoom cam ring 6B, accurate alignment in the optical axis direction (coaxial state) relative to the integrally-supported frame 10, i.e. the third lens group L3, can be maintained by the guide shaft 107 and the three guide grooves 103 through 105, whereby tilting/decentration of the lens frames is prevented, and a stable imaging performance during photographing can be accomplished. In particular, as compared with the other lens groups, the fourth lens group L4 has a higher performance sensitivity in regard to field curvature and spherical aberration, etc., and therefore, by improving stability of the fourth lens group L4, the field curvature and/or spherical aberration can be effectively corrected.

The present embodiment as discussed above illustrates the varifocal lens barrel that is provided with a varifocal lens system configured of four lens groups, as an example of the present invention. However, the number of lens groups of the present invention is not limited to this embodiment. Furthermore, the number and positions of sub zoom cam rings are not limited to the structure of the present embodiment either.

The present invention may be applied to a lens barrel, provided with a plurality of lens groups so that these lenses may move linearly in the optical axis direction without rotating about the optical axis during zooming and focusing. In particular, the present invention may be applied to a varifocal type lens barrel.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A varifocal lens barrel including a plurality of lens groups, each of the plurality of lens groups is linearly movable in an optical axis direction thereof without rotating about the optical axis during a zooming operation and during a focusing operation, the varifocal lens barrel comprising:
   a base barrel which is linearly movable in the optical axis direction by rotation of a zoom operational ring, wherein lens frames of respective said lens groups are each supported by said base barrel,
   a zoom cam ring that is rotatable by manual rotation of said zoom operational ring;
   at least one sub zoom cam ring which is integrally rotatable together with said zoom cam ring, wherein each said sub zoom cam ring is supported by said base barrel via cam engagement with said zoom cam ring and is movable in the optical axis direction by rotation of said zoom cam ring,
   wherein at least one lens frame of a corresponding lens group of said plurality of lens groups is in cam engagement with said at least one sub zoom cam ring so that said at least one lens frame is movable in the optical axis direction by rotation of said at least one sub zoom cam ring.

2. The varifocal lens barrel according to claim 1, wherein at least one lens group of said plurality of lens groups is integrally supported by said base barrel, and the other lens groups of said plurality of lens groups are supported by said base barrel to be movable in the optical axis direction relative to said base barrel.

3. The varifocal lens barrel according to claim 1, wherein said at least one sub zoom cam ring comprises a plurality of sub zoom cam rings and one of said plurality of sub zoom cam rings which has a smallest diameter of said plurality of sub zoom cam rings, is provided at a rearwardmost position with respect to the other sub zoom cam rings of said plurality of sub zoom cam rings, with respect to the optical axis direction.

4. The varifocal lens barrel according to claim 1, wherein said corresponding lens group of said at least one lens frame that is in cam engagement with said sub zoom cam rings comprises a focusing lens group,
   wherein the lens frame of said focusing lens group includes a main lens frame and a sub lens frame, which are respectively relatively movable with respect to each other in the optical axis direction;
   wherein said sub lens frame is in cam engagement with one of said sub zoom cam rings and moves in the optical axis direction during zooming; and
   wherein said main lens frame integrally supports said focusing lens group and is movable in the optical axis direction relative to said sub lens frame without relatively rotating about the optical axis.

5. The varifocal lens barrel according to claim 4, wherein one of said main lens frame and said sub lens frame is provided with at least one open connection groove that is elongated in the optical axis direction, and
   wherein the other of said main lens frame and said sub lens frame is provided with a corresponding connection lug which is engaged with said open connection groove and is linearly movable relative to said open connection groove in the optical axis direction.

6. The varifocal lens barrel according to claim 5, further comprising:
   a focus cam ring which is integrally rotatable with said sub zoom cam rings and is relatively movable with respect to said sub zoom cam rings in the optical axis direction; and
   a movable member which is in cam engagement with said focus cam ring and is also in cam engagement with said sub lens frame, wherein said movable member is linearly movable in the optical axis direction and is rotatable about the optical axis,
   wherein said movable member is rotatably engaged with said main lens frame so that said movable member is integrally connected with said main lens frame in the optical axis direction and so that said movable member is relatively rotatable about the optical axis with respect to said main lens frame.

7. The varifocal lens barrel according to claim 1, further comprising:
   a focusing lens group comprising one of said plurality of lens groups; and
   a focus cam ring which changes a moving amount of said focusing lens group in the optical axis direction in accordance with a predetermined angle by which a focus operation member is rotated during a focusing operation,
   wherein said focusing lens group does not rotate about the optical axis, and
   wherein a movable member, the position of which, relative to said focus cam ring, in the optical axis direction changes by rotation of said movable member during focusing, is rotatably engaged with said focusing lens group so that said movable member is fixedly connected with said focusing lens group in the optical axis direction and so that said movable member is relatively rotatable about the optical axis with respect to said focusing lens group.

8. The varifocal lens barrel according to claim 7, wherein said focusing lens group is supported by a lens frame, said lens frame comprising a main lens frame and a sub lens frame, which are relatively movable with respect to each other in the optical axis direction;
   wherein said sub lens frame moves in the optical axis direction during zooming; and
   wherein said main lens frame integrally supports said focusing lens group such that said main lens frame is fixedly connected with said movable member in the optical axis direction and so that said movable member rotates about the optical axis relative to said main lens frame.

9. The varifocal lens barrel according to claim 1, wherein said lens groups include an integrally-supported lens group, which is integrally supported by said base barrel so as to move integrally with said base barrel in the optical axis direction, and a movably-supported lens group which is movable in the optical axis direction relative to said base barrel;
   wherein an integrally-supported lens frame of said integrally-supported lens group is provided with a guide shaft, and at least three guide grooves which are provided at circumferential positions about the optical axis and are respectively elongated in the optical axis direction; and
   wherein a movably-supported lens frame of said movably-supported lens group is provided with a small hole into which said guide shaft is inserted, and is provided with three guide lugs which are engaged with said three guide grooves, respectively.

10. The varifocal lens barrel according to claim 9, wherein said guide shaft and one of said guide grooves are provided at said integrally-supported lens frame at diametrically opposite positions, and
    wherein the other two of said guide grooves are provided at said integrally-supported lens frame at respective circumferential positions so as to be interposed by an imaginary line connecting the centers of said guide shaft with said one of said guide grooves.

11. A varifocal lens barrel including first through fourth lens groups, each of the plurality of lens groups is linearly movable in the optical axis direction thereof without rotating about an optical axis during a zooming operation and a focusing operation, the varifocal lens barrel comprising:
    a zoom cam ring which is integrally rotatable with a zoom operational ring, said zoom cam ring being supported by a fixed barrel so as to be manually rotatable about the optical axis;
    a base barrel which is linearly movable in the optical axis direction by rotation of said zoom cam ring;
    first and second sub zoom cam rings which are supported by said base barrel to be rotatable about the optical axis, one of said first and second sub zoom cam rings is integrally rotatable together with said zoom cam ring, each of said first and second sub zoom cam rings is supported by said base barrel via cam engagement with said zoom cam ring and is movable in the optical axis direction by rotation of said zoom cam ring;
    a first lens frame which supports said first lens group and is linearly movable in the optical axis direction by rotation of said first sub zoom cam ring;
    a second lens frame which supports said second lens group and is linearly movable in the optical axis direction by rotation of first sub zoom cam ring;
    a third lens frame which supports said third lens group so as to be integrally supported by said base barrel;
    a fourth lens frame which supports said fourth lens group and is linearly movable in the optical axis direction by rotation of said second sub zoom cam ring;

a focus cam ring which is integrally rotatable together with said first sub zoom cam ring and is movable in the optical axis direction relative to said first sub zoom cam ring; and a movable member which is rotatable about the optical axis and is linearly movable in the optical axis direction, said movable member being in cam engagement with said focus cam ring and integrally rotating with a focus operational ring that is supported by said fixed barrel to be manually rotatable about the optical axis, wherein said first lens frame is in cam engagement with said first sub zoom cam ring and is linearly movable in the optical axis direction by rotation of said first sub zoom cam ring; and wherein said second lens frame includes a sub lens frame which is in cam engagement with said first sub zoom cam ring to be linearly movable in the optical axis direction by rotation of said first sub zoom cam ring, and a main lens frame which supports said second lens group to be movable only in the optical axis direction relative to said sub lens frame, so that said sub lens frame is in concurrent cam engagement with said first sub zoom cam ring and with said focus cam ring, and so that said main lens frame is integrally connected with said movable member to be movable in the optical axis direction and engaged with said movable member to be rotatable about the optical axis.

12. The varifocal lens barrel according to claim 11, wherein said third lens frame is provided with a guide shaft, and at least three guide grooves which are provided at circumferential positions about the optical axis and are respectively elongated in the optical axis direction;

wherein said fourth lens frame is provided with a small hole into which said guide shaft is inserted, and is provided with three guide lugs which are engaged with said three guide grooves, respectively;

wherein said guide shaft and one of said guide grooves are provided at diametrically opposite positions with respect to each other, and wherein the other two of said guide grooves are provided at said third lens frame at respective circumferential positions so as to be interposed by an imaginary line connecting the centers of said guide shaft with said one of guide grooves.

13. A varifocal lens barrel including a plurality of lens groups, each of the plurality of lens groups is linearly movable in the optical axis direction thereof without rotating about the optical axis when being moved in the optical axis direction, the varifocal lens barrel comprising:

a base barrel which is linearly movable in the optical axis direction by rotation of a zoom operational ring;

a lens frame which is linearly movable along the optical axis; a movable member which integrally moves together with said lens frame in the optical axis direction while being rotatable relative to said lens frame a zoom cam ring which is rotatable by manual rotation of said zoom operational ring, and at least one sub zoom cam ring which is integrally rotatable with said zoom cam ring, wherein each said sub zoom cam ring is supported by said base barrel via cam engagement with said zoom cam ring and is movable in the optical axis direction by rotation of said zoom cam ring, wherein at least one lens frame of a corresponding lens group of said plurality of lens groups is in cam engagement with said at least one sub zoom cam ring so that said at least one lens frame is movable in the optical axis direction by rotation of said at least one sub zoom cam ring.

14. The varifocal lens barrel according to claim 13, wherein said lens frame supports a focusing lens group and is in cam engagement with said sub zoom cam rings, wherein said lens frame of said focusing lens group includes a main lens frame and a sub lens frame, which are relatively movable with respect to each other in the optical axis direction;

wherein said sub lens frame is in cam engagement with one of said sub zoom cam rings and moves in the optical axis direction during zooming; and wherein said main lens frame integrally supports said focusing lens group and is movable in the optical axis direction relative to said sub lens frame without relatively rotating about the optical axis.

15. The varifocal lens barrel according to claim 14, further comprising:

a focus cam ring which is integrally rotatable with said sub zoom cam rings and relatively movable with respect to said sub zoom cam rings in the optical axis direction, wherein said movable member is in cam engagement with said focus cam ring and is also in cam engagement with said sub lens frame, wherein said movable member is linearly movable in the optical axis direction and is rotatable about the optical axis, and wherein said movable member is rotatably engaged with said main lens frame so that said movable member is integrally connected with said main lens frame in the optical axis direction and so that said movable member is relatively rotatable about the optical axis with respect to said main lens frame.

16. The varifocal lens barrel according to claim 13, further comprising:

a focusing lens group comprising one of said plurality of lens groups; and a focus cam ring which changes a moving amount of said focusing lens group in the optical axis direction in accordance with a predetermined angle by which a focus operation member is rotated during a focusing operation, wherein said focusing lens group does not rotate about the optical axis, and wherein said movable member, a position of said movable member relative to said focus cam ring in the optical axis direction changes by rotation of said movable member during focusing, is rotatably engaged with said focusing lens group so that said movable member is integrally connected with said focusing lens group in the optical axis direction and so that said movable member is relatively rotatable about the optical axis with respect to said focusing lens group.

17. The varifocal lens barrel according to claim 16, wherein said focusing lens group is supported by a lens frame, said lens frame comprising a main lens frame and a sub lens frame, which are relatively movable with respect to each other in the optical axis direction;

wherein said sub lens frame moves in the optical axis direction during zooming; and wherein said main lens frame integrally supports said focusing lens group such that said main lens frame is integrally connected with said movable member in the optical axis direction and so that said movable member rotates about the optical axis relative to said main lens frame.

* * * * *